(No Model.) 2 Sheets—Sheet 2.
M. P. STEVENS.
LAMP.
No. 599,520. Patented Feb. 22, 1898.
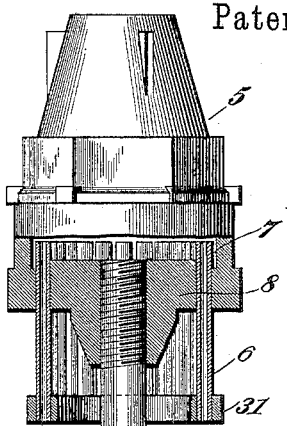
Fig. II.
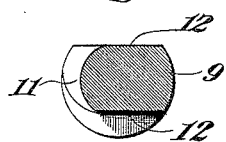
Fig. V.
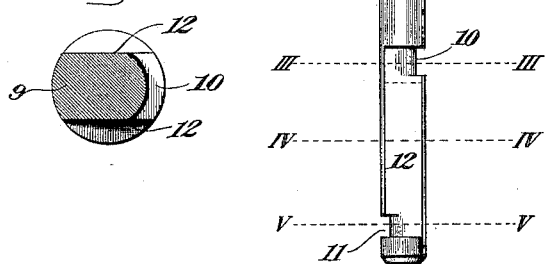
Fig. III.
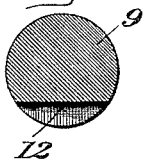
Fig. IV.
Witnesses
M. E. Fowler
S. Macker
Inventor:
Merton P. Stevens,
By Joseph L. Atkins
Attorney
THE NORRIS PETERS CO., PHOTO-LITHO., WASHINGTON, D. C.

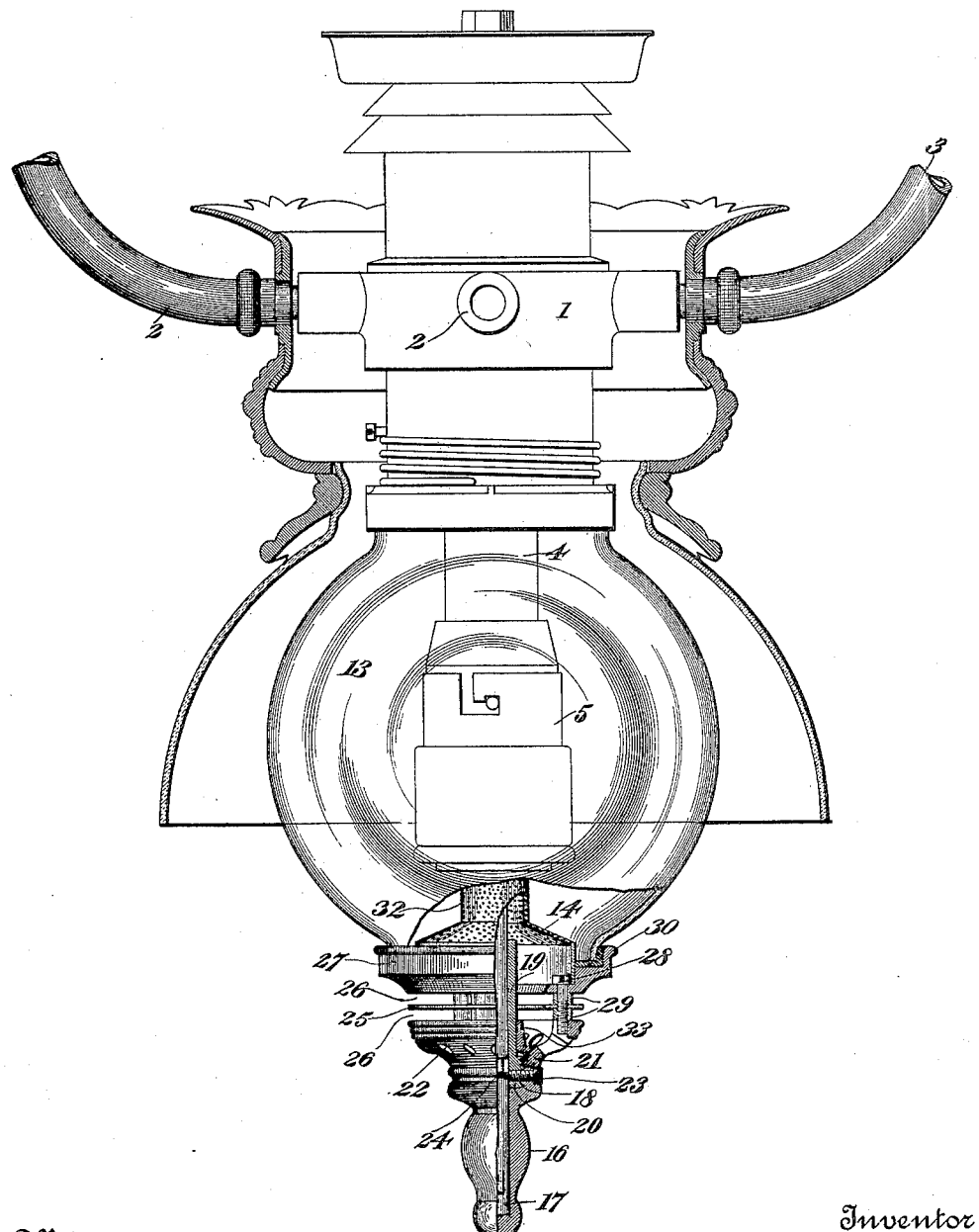

UNITED STATES PATENT OFFICE.

MERTON P. STEVENS, OF EAST ORANGE, NEW JERSEY, ASSIGNOR TO THE SAFETY CAR HEATING AND LIGHTING COMPANY, OF NEW YORK, N. Y.

LAMP.

SPECIFICATION forming part of Letters Patent No. 599,520, dated February 22, 1898.

Application filed December 15, 1896. Serial No. 615,779. (No model.)

*To all whom it may concern:*

Be it known that I, MERTON P. STEVENS, of East Orange, in the county of Essex, State of New Jersey, have invented certain new and useful Improvements in Lamps, of which the following is a complete specification, reference being had to the accompanying drawings.

The object of my invention is to produce improvements in lamps, chiefly of that class known as "Argand" lamps, whereby currents of air supplied to support combustion within the lamp are regulated and controlled, so as to promote the steadiness of the flame.

Heretofore in lamps of this class air supplied through the lower part of the lamp has been delivered into the lamp through upwardly-opening passages. The consequence in practice has been that the air reaches the flame in unequal currents, thereby producing unsteadiness and inequality of shape in the flame.

By my invention it is proposed to supply air in a uniform and steady flow and to deliver it within the lamp in such manner as to secure the best practical results.

In the accompanying drawings, Figure I is a side elevation of a lamp constructed in accordance with my invention, showing portions thereof, particularly such as relate especially to my improvements, in section. Fig. II is an elevation of the burner and burner-post, the former being partly in section. Fig. III is a section on the line III III of Fig. II. Fig. IV is a section on the line IV IV of Fig. II. Fig. V is a section on the line V V of Fig. II.

Referring to the figures on the drawings, 1 indicates the head or frame piece of a lamp, that is adapted to be secured in place as by the usual brackets 2, one of which (designated as 3) is tubular throughout, and communicating through an interior tube or gasway 4 with the burner constitutes the exterior gas-supply pipe.

From the head 1, as by means of the tube or gasway 4, is suspended a burner 5 of approved construction, preferably provided, as clearly illustrated in Fig. II of the drawings, with an annular series of cylindrically-disposed tubes 6, that communicate through the chamber 7 of the burner with the tube 4 and from it derive their gas-supply.

From the bottom 8 of the burner depends a burner-post 9, the post being located concentrically within the series of cylindrical tubes 6. (See Fig. II.) The burner-post is designed to movably support the lower elements which constitute the lamp and is provided on its lower end with a devious track composed of an upper transverse groove 10, a lower transverse groove 11, and an intermediate vertical plane 12. (Illustrated in detail in Figs. II, III, IV, and V.)

I do not deem it necessary to describe in minute detail the construction of all the parts above recited, inasmuch as they are generally susceptible of variation, most of those illustrated being of a type well known in the art and constituting a lamp to which my invention is applicable and not the invention itself.

The post 9 serves, by means of suitable supporting mechanism hereinafter to be described in detail, to carry a globe 13 and the air distributer or spreader 14, common in lamps of this class. The pipe 3, communicating through the pipe 4 with the burner 5 in the manner previously described, in practice supplies gas under pressure to the burner-tube 6, at whose lower ends it is ignited, where it forms an everted flame around the lower part of the burner within the globe 13.

With the mechanism employed to support the globe 13 upon the burner-post 9 I incorporate the means which I propose to employ for regulating the supply of air and shall therefore proceed to describe the same in detail.

The mechanism referred to consists preferably of a lower terminal or pendent piece 16, which is provided with an internal bore 17, that fits snugly upon the lower end of the burner-post 9. At its upper end it is internally screw-threaded, as indicated at 18, to receive the lower screw-threaded extremity of the center frame-piece 19. The screw-threaded extremity 20 of the frame-piece already referred to extends above the top of the pendent piece 16 when those parts are united together and carries also the internally-screw-threaded top piece 21, the latter being preferably provided with an annular series of perforations 22.

23 indicates a screw that passes through an aperture provided for it in the pendent piece 16 and in the screw-threaded end 20 of the center frame-piece 19, thereby serving to lock those parts together when they have been assembed. The screw is also provided with a screw-tip 24, which may be caused to abut against the face of the burner-post 9 and to unite the pendent piece 16 and its superimposed parts to the post. The screw-tip 24, when the parts are assembled, enters the groove 10, from which it cannot escape without first being loosened and then turned to correspond with the changes of direction of that devious track of which the channel 10 constitutes the upper portion.

Above the top piece 21 and united thereto I provide one or more flat annular plates or vanes 25, which define horizontally-disposed apertures 26 in place of the upwardly-opening passages above referred to as heretofore employed in lamps of this class. The uppermost of the horizontal apertures 26 is defined as to its upper wall by a ring 27, said ring, vanes, and top piece 21 being united, as by screws 28, around which are located cylindrical spacing-blocks 29, above and below the vanes 25.

The spacing-blocks serve to secure the vane or vanes in place and to properly define the horizontally-disposed apertures 26. The ring 27 supports upon its outside flange 30 in the usual manner the globe 13. It also carries the spreader 14. The spreader 14 being carried upon the ring 27, which in turn is supported upon the center post 9 by means of the elements previously described, its position, as well as the position of the spreader 14, which it carries, is dependent upon the relation of the connection to the center post.

Now in practice in order to obtain an even flame within a lamp of this description it is essential that the annular space between the inside of the burner-ring 31, which unites the lower end of the tube 6 and the outside of the cylindrical portion 32 of the spreader 14, should be uniform. Heretofore in lamps of this class the mechanical element which supports the spreader upon the burner-post has been difficult to adjust properly, and consequently trouble has often been met with in obtaining an even flame. By my invention I provide ready means for securing the proper relative position of the spreader with respect to the burner-ring 31. Such mechanism consists in providing an elongated center frame-piece 19, which extends as far up into the spreader 14 as possible without shutting off from the spreader the supply of air. This elongated center frame-piece affording an extensive bearing upon the center post 9 insures the proper relations of the parts and the correct centering of the cylindrical portion 32 of the spreader upon the burner-post 9, which, as above described, is accurately concentric with the cylindrical series of burner-tubes 6, and consequently with the burner-ring 31. As illustrated, the top piece 21 is rigidly braced around the center frame-piece by means of an upwardly-extending flange 33. (Clearly shown in Fig. I.) In practice currents of air introduced into the horizontally-disposed apertures 26 are brought into direct opposition. Consequently to a degree they nullify each other, producing a steady uniform draft upwardly through the spreader 14 and against the flame which issues from the tubes 6. Not only are the air-currents equalized upon their entrance through the apertures 26, but through the means for properly centering the cylindrical portion 32 of the spreader 14 with respect to the burner-ring 31 they are delivered properly to the flame, thereby materially contributing to its steadiness and evenness of shape.

What I claim is—

In a lamp, the combination with its frame, gasway, burner, and spreader, of a burner-post depending from the burner, a pendent piece fitting the lower end thereof, an elongated center frame-piece screwing into the upper end of the pendent piece, a top piece screwing upon the center frame-piece above the pendent piece, horizontally-disposed, mechanically-defined air-supply apertures above the top piece, a ring constituting the uppermost wall of the highest aperture, said ring supporting directly the spreader, and means for securing the pendent piece, and the parts assembled thereon to the burner-post, substantially as set forth.

In testimony of all which I have hereunto subscribed my name.

MERTON P. STEVENS.

Witnesses:
H. G. DARWIN,
J. MACDONALD.